No. 682,014. Patented Sept. 3, 1901.
J. P. H. ADAMS.
KEYBOARD FOR MUSICAL INSTRUMENTS.
(Application filed Apr. 15, 1901.)
(No Model.)
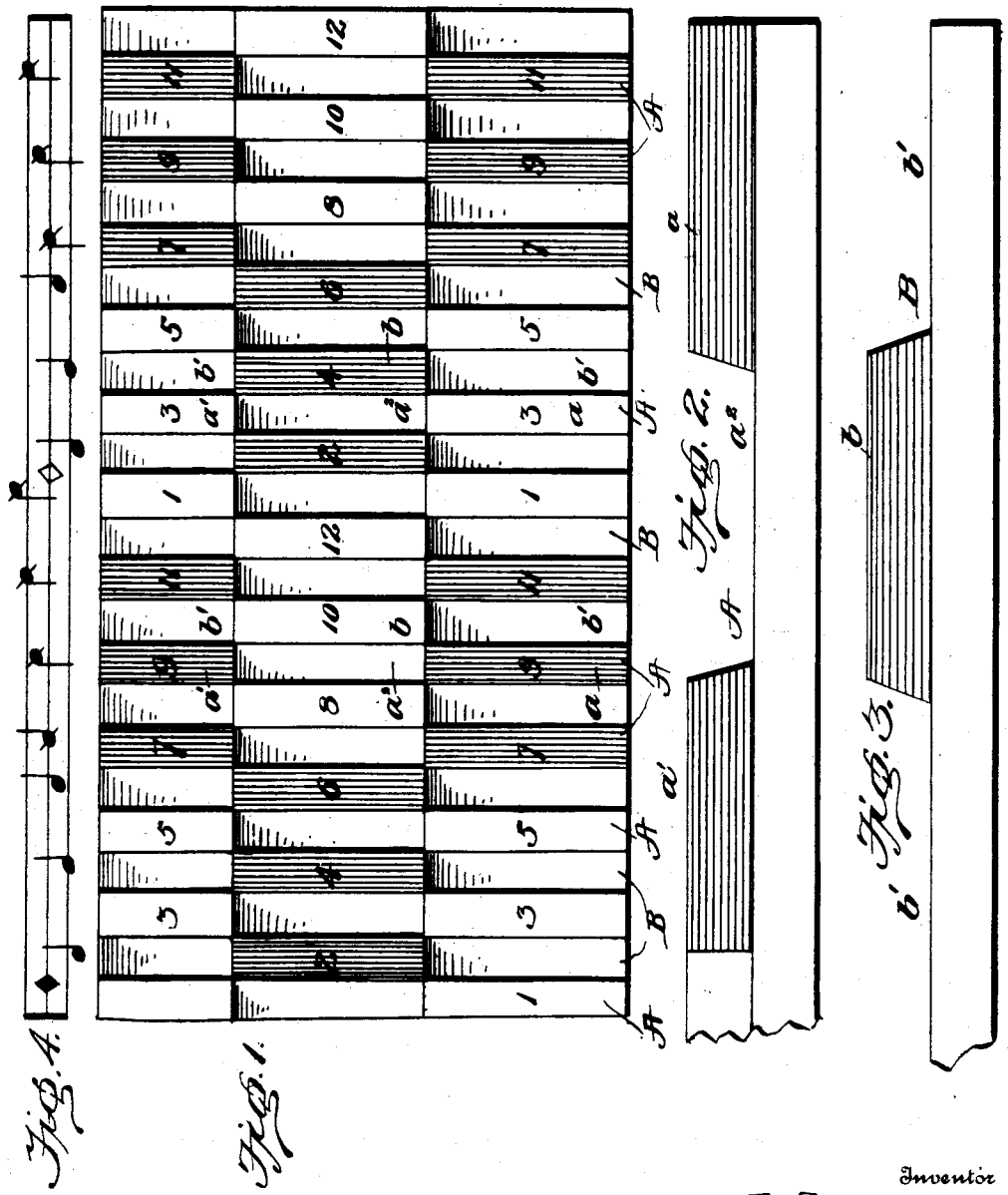

UNITED STATES PATENT OFFICE.

JOHANN PETER H. ADAMS, OF ST. PAUL, MINNESOTA.

KEYBOARD FOR MUSICAL INSTRUMENTS.

SPECIFICATION forming part of Letters Patent No. 682,014, dated September 3, 1901.

Application filed April 15, 1901. Serial No. 55,886. (No model.)

*To all whom it may concern:*

Be it known that I, JOHANN PETER H. ADAMS, a subject of the Emperor of Germany, residing at St. Paul, in the county of Ramsey and State of Minnesota, have invented certain new and useful Improvements in Keyboards for Musical Instruments; and I do declare the following to be a full, clear, and exact description of the invention, such as will enable others skilled in the art to which it appertains to make and use the same.

This invention relates to keyboards for organs, pianos, melodeons, and other similar musical instruments; and the object thereof is to provide a keyboard wherein the keys of the key-levers are so disposed as to facilitate and render easier the learning of the location of the keys and to enable the player to operate the keys with greater ease and facility than is possible with the form of keyboard in common use.

The keyboard is designed especially to be used in connection with my improved system of musical notation for which I have made application for patent of even date herewith, Serial No. 55,887.

The invention will be hereinafter more fully described and then particularly pointed out in the appended claim.

In the accompanying drawings, Figure 1 is a top plan view showing the keys of two octaves of a keyboard embodying my invention, and Figs. 2 and 3 are side elevational views of one of each of the two sets of key-levers. Fig. 4 is a view showing the manner in which the twelve tones used in music are represented in my improved notation set forth in my other application above referred to.

In accordance with my invention two sets of key-levers A and B are employed, the levers A each having an outer key or finger-piece $a$ and an inner key or finger-piece $a'$, separated by an intermediate space $a^2$, and the levers B each having a single key or finger-piece $b$, (see Figs. 2 and 3,) located so as to lie on a line between the said keys of the levers A. (See Fig. 1.) The unoccupied portions $b'$ and the corresponding portions $a^2$ of the levers A and B have in practice the same color. The occupied portions of the levers A and B or the finger-pieces $a$, $a'$, and $b$ are covered on their upper surfaces in practice by a white ivory plate, but only the levers which represent the tones 1, 3, 5, 8, 10, and 12 are so covered. The levers which represent the tones 2, 4, 6, 7, 9, and 11 have a black surface. The twelve tones used in music are represented in each octave by the corresponding numbers shown in the drawings. The keys 2, 4, 6, 8, 10, and 12 are the keys $b$ (shown in Fig. 2) and are arranged intermediate of the inner and outer sets of keys 1, 3, 5, 7, 9, and 11, which are the keys $a$ $a'$. (Shown in Fig. 1.) The keys 1, 3, 5, 7, 9, and 11 are therefore arranged in duplicate above and below or on opposite sides of the keys 2, 4, 6, 8, 10, and 12. It will thus be seen that the keys are arranged in four groups, each group consisting of three like-colored keys.

The advantages of my improved keyboard are as follows:

First. The new keyboard is specially adapted for the new music notation set forth in my other application heretofore referred to and shown in Fig. 4 of the annexed drawings, as the keys for the crossed, as also the uncrossed notes, follow in succeeding rows.

Second. Every key is in a level position with its neighboring key, thereby allowing the hand a freer movement.

Third. The twelve keys are arranged in four equal groups, consisting always of three keys of the same shape and color. The keys denoting the crossed notes are in a succeeding progression, as also the keys denoting the uncrossed notes, and can be more easily distinguished in this arrangement than in the old type of keyboard.

Fourth. The new keyboard is more suitable for small and heavy hands than the old one, because the neighboring keys are separated by a deeper space between.

Fifth. All chords which have the same intervals require the same determined position of the fingers, and as all the different intervals require a different position of the fingers the player's fingers therefore picture the harmonic structure of the music-piece.

Sixth. The new direct notation, as also the new keyboard, are more suitable for transposition than the old ones.

Seventh. The notes indicate the position of the fingers in a harmonic progression of tones.

In a melodic progression of tones the player may strike the keys as most convenient. In a harmonic progression where two or more notes are played at the same time by one hand the notes in the three upper lines are played by the right hand, thus: The lowest note, which is always played by the thumb, is struck, when a cross-lined note upon the key-piece of the odd-numbered levers, (designated $a$,) is to be played, the other notes by the other fingers, as most convenient. If the lowest note is an uncrossed note, it can only be struck at one place and must be struck by the thumb also. In a harmonic progression where two or more notes are played at the same time by the left hand, which has to play the notes in the three lower lines, the uppermost note must always be played by the thumb of the left hand. If this uppermost note is a cross-lined note, the thumb is employed to strike the odd-numbered levers, (designated $a$,) and the other notes are to be played by the other fingers, as convenient.

Eighth. The pupil able to read and strike the twelve notes can as easily execute a piece of music in C major as G-flat major or in F-sharp major or in any other progression of tones.

Having thus fully described my invention, what I claim as new, and desire to secure by Letters Patent, is—

A keyboard for musical instruments comprising two sets of key-levers, the levers of one set having upper and lower rows of keys and the levers of the other set a central row of keys which lies on a line between said upper and lower rows of keys, said keys being arranged in the same plane and in alternate groups of two different colors in each row, substantially as described.

In testimony whereof I have hereunto set my hand in presence of two subscribing witnesses.

JOHANN PETER H. ADAMS.

Witnesses:
F. L. BREEN,
E. J. HEIMBACH.